United States Patent
Furuyama et al.

(10) Patent No.: US 9,640,818 B2
(45) Date of Patent: May 2, 2017

(54) FUEL CELL AND METHOD OF OPERATING THE FUEL CELL

(71) Applicant: HONDA MOTOR CO., LTD., Minato-ku, Tokyo (JP)

(72) Inventors: Masataka Furuyama, Utsunomiya (JP); Keiko Yamazaki, Utsunomiya (JP); Ryo Jinba, Utsunomiya (JP); Hiromichi Yoshida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 627 days.

(21) Appl. No.: 13/647,475

(22) Filed: Oct. 9, 2012

(65) Prior Publication Data

US 2013/0095402 A1  Apr. 18, 2013

(30) Foreign Application Priority Data

Oct. 12, 2011  (JP) .................................. 2011-224439
Sep. 28, 2012  (JP) .................................. 2012-217207

(51) Int. Cl.
| H01M 8/06 | (2016.01) |
| H01M 8/04858 | (2016.01) |
| H01M 8/04791 | (2016.01) |
| H01M 8/1018 | (2016.01) |

(52) U.S. Cl.
CPC ..... *H01M 8/0488* (2013.01); *H01M 8/04791* (2013.01); *H01M 2008/1095* (2013.01)

(58) Field of Classification Search
CPC .................... H01M 8/04537–8/04567; H01M 8/04858–8/04888; H01M 8/0488; H01M 8/04791

USPC .......................................................... 429/427
See application file for complete search history.

(56) References Cited

U.S. PATENT DOCUMENTS

| 5,338,430 | A | * | 8/1994 | Parsonage .......... G01N 27/4045 204/412 |
| 6,106,692 | A | | 8/2000 | Kunimatsu et al. |
| 2003/0141188 | A1 | * | 7/2003 | Imamura et al. ............. 204/424 |
| 2005/0118468 | A1 | * | 6/2005 | Adams .............. H01M 8/04194 429/410 |
| 2007/0037030 | A1 | * | 2/2007 | Ogami et al. ................... 429/30 |

FOREIGN PATENT DOCUMENTS

| JP | H1183799 A | | 3/1999 |
| JP | 2004273209 A | * | 9/2004 |
| JP | 2007-005000 A | | 1/2007 |
| JP | 2007103114 A | * | 4/2007 |

(Continued)

OTHER PUBLICATIONS

JP 2004-273209 English Translation, Translated on Feb. 9, 2015, via JPO.*

(Continued)

*Primary Examiner* — Nicholas P D'Aniello
*Assistant Examiner* — Jimmy K Vo
(74) *Attorney, Agent, or Firm* — Carrier Blackman & Associates, P.C.; Joseph P. Carrier; Anne G. Sabourin

(57) ABSTRACT

A method of operating a fuel cell includes the steps of detecting hydrogen peroxide concentration during power generation by a hydrogen peroxide concentration sensor provided directly on a membrane electrode assembly and determining an operating condition of the fuel cell based on the detected hydrogen peroxide concentration.

9 Claims, 25 Drawing Sheets

(56) References Cited

FOREIGN PATENT DOCUMENTS

JP         4554163 B2    9/2010
JP    2011096387 A    5/2011

OTHER PUBLICATIONS

JP 2007-103114 English Translation via JPO Translated Mar. 15, 2016.*
Office Action dated Oct. 27, 2015 issued over the corresponding Japanese Patent Application No. 2012-217207 with the English translation of pertinent portion.

* cited by examiner

FIG. 14

| CONDITION | OPERATING CONDITION ① | OPERATING CONDITION ② | H₂O₂ CONCENTRATION | ELECTRIC POTENTIAL RANGE |
|---|---|---|---|---|
| A | I | i | a | Z |
| B | II | ii | b | Y |
| C | III | iii | c | X |
| D | IV | iv | d | W |

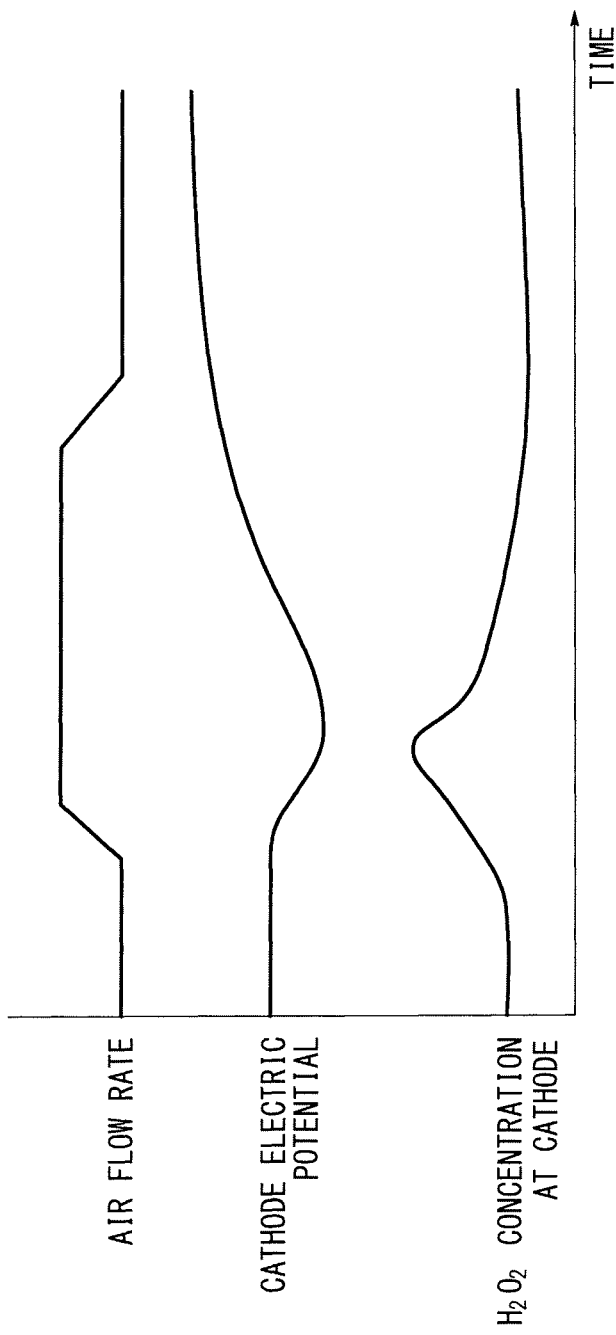

FUEL CELL AND METHOD OF OPERATING THE FUEL CELL

CROSS-REFERENCE TO RELATED APPLICATIONS

This application is based upon and claims the benefit of priority from Japanese Patent Applications No. 2011-224439 filed on Oct. 12, 2011 and No. 2012-217207 filed on Sep. 28, 2012, the contents all of which are incorporated herein by reference.

BACKGROUND OF THE INVENTION

Field of the Invention

The present invention relates to a fuel cell formed by stacking a membrane electrode assembly and a separator. The membrane electrode assembly includes an anode, a cathode, and an electrolyte membrane interposed between the anode and the cathode. Further, the present invention relates to a method of operating the fuel cell.

Description of the Related Art

For example, a solid polymer electrolyte fuel cell employs a solid polymer electrolyte membrane. The solid polymer electrolyte membrane is a solid polymer ion exchange membrane. In the fuel cell, the solid polymer electrolyte membrane is interposed between an anode and a cathode to form a membrane electrode assembly (MEA). Each of the anode and the cathode includes electrode catalyst as an electrode catalyst layer and porous carbon as a gas diffusion layer. The membrane electrode assembly is sandwiched between separators (bipolar plates) to form a power generation cell. In use of the fuel cell, generally, a predetermined number of power generation cells are stacked together to form a fuel cell stack, e.g., mounted in a vehicle.

In this type of fuel cell, in some cases, a fuel gas permeates from the anode side to the cathode side through the solid polymer electrolyte membrane, and an oxygen-containing gas permeates from the cathode side to the anode side through the solid polymer electrolyte membrane.

In the structure, at the anode and the cathode, hydrogen peroxide ($H_2O_2$) tends to be generated easily ($H_2 + O_2 \rightarrow H_2O_2$) by the reaction of hydrogen and oxygen. This hydrogen peroxide is decomposed on carbon carriers and platinum (Pt) in an electrode, and for example, active substances such as hydroxyl radical (.OH) are generated. As a result, the solid polymer electrolyte membrane and the electrode catalyst are degraded disadvantageously.

In this regard, a system of operating a fuel cell disclosed in Japanese Patent No. 4554163 (hereinafter referred to as the conventional technique) is known. This conventional technique relates to a system of operating a fuel cell formed by stacking a plurality of electrode assemblies through separators. Each of the electrode assemblies includes a fuel electrode, an oxygen electrode, and an electrolyte interposed between the fuel electrode and the oxygen electrode. A fuel gas containing hydrogen is supplied to the fuel electrode, and an oxygen-containing gas is supplied to the oxygen electrode.

The operating system includes hydrogen peroxide concentration measurement means for measuring concentration of hydrogen peroxide contained in at least one of a fuel electrode side exhaust gas and a fuel electrode side collected water discharged from the fuel electrode and an oxygen electrode side exhaust gas and an oxygen electrode side collected water discharged from the oxygen electrode, determining means for determining whether or not the hydrogen peroxide concentration measured by the hydrogen peroxide concentration measurement means is a predetermined upper limit value or less, operating condition control means for controlling at least one of current density, pressure of the fuel gas, gas excess ratio at the fuel electrode, gas excess ratio at the oxygen electrode, relative humidity of the fuel gas, and relative humidity of the oxygen-containing gas as operating conditions of the fuel cell, if it is determined that the hydrogen peroxide concentration exceeds the upper limit value, so as to suppress generation of hydrogen peroxide.

According to the disclosure, in the structure, it is possible to keep track of the state of generation of hydrogen peroxide as a cause of degradation in the cell performance, and by controlling the operating conditions as necessary, it becomes possible to stably operate the fuel cell over a long period of time without suffering degradation in the cell performance.

SUMMARY OF THE INVENTION

In the conventional technique, concentration of hydrogen peroxide contained in the fuel electrode exhaust gas or the like discharged from the fuel electrode, or the oxygen electrode side exhaust gas or the like discharged from the oxygen electrode is measured. Therefore, concentration of hydrogen peroxide generated at the fuel electrode or the oxygen electrode cannot be detected directly in real time. Thus, the operating conditions of the fuel cell cannot be controlled highly accurately in correspondence with the actual hydrogen peroxide concentration.

The present invention has been made to solve the problem of this type, and an object of the present invention is to provide a fuel cell and a method of operating the fuel cell which make it possible to reliably detect hydrogen peroxide concentration in real time, effectively suppress degradation of an electrolyte membrane or the like, and control operation of the fuel cell in a suitable state.

The present invention relates to a fuel cell formed by stacking a membrane electrode assembly and a separator. The membrane electrode assembly includes an anode, a cathode, and an electrolyte membrane interposed between the anode and the cathode. Further, the present invention relates to a method of operating the fuel cell.

The operating method includes the steps of detecting hydrogen peroxide concentration during power generation by a hydrogen peroxide concentration sensor provided directly on the membrane electrode assembly and determining an operating condition of the fuel cell based on the detected hydrogen peroxide concentration.

Further, in this fuel cell, a hydrogen peroxide concentration sensor for detecting hydrogen peroxide concentration during power generation is provided directly on the membrane electrode assembly.

In the present invention, the hydrogen peroxide concentration sensor is provided directly on the membrane electrode assembly. Therefore, it is possible to promptly and reliably detect concentration of hydrogen peroxide generated in the membrane electrode assembly. Thus, it becomes possible to reliably detect the hydrogen peroxide concentration in real time, effectively suppress degradation of the electrolyte membrane or the like, and control operation of the fuel cell in a suitable state.

The above and other objects, features and advantages of the present invention will become more apparent from the following description when taken in conjunction with the accompanying drawings in which preferred embodiments of the present invention is shown by way of illustrative example.

BRIEF DESCRIPTION OF THE DRAWINGS

FIG. 14 is a map showing power generation conditions of the fuel cell;

FIG. 25 is a timing chart of still another operating method.

DESCRIPTION OF THE PREFERRED EMBODIMENTS

Figure 1:
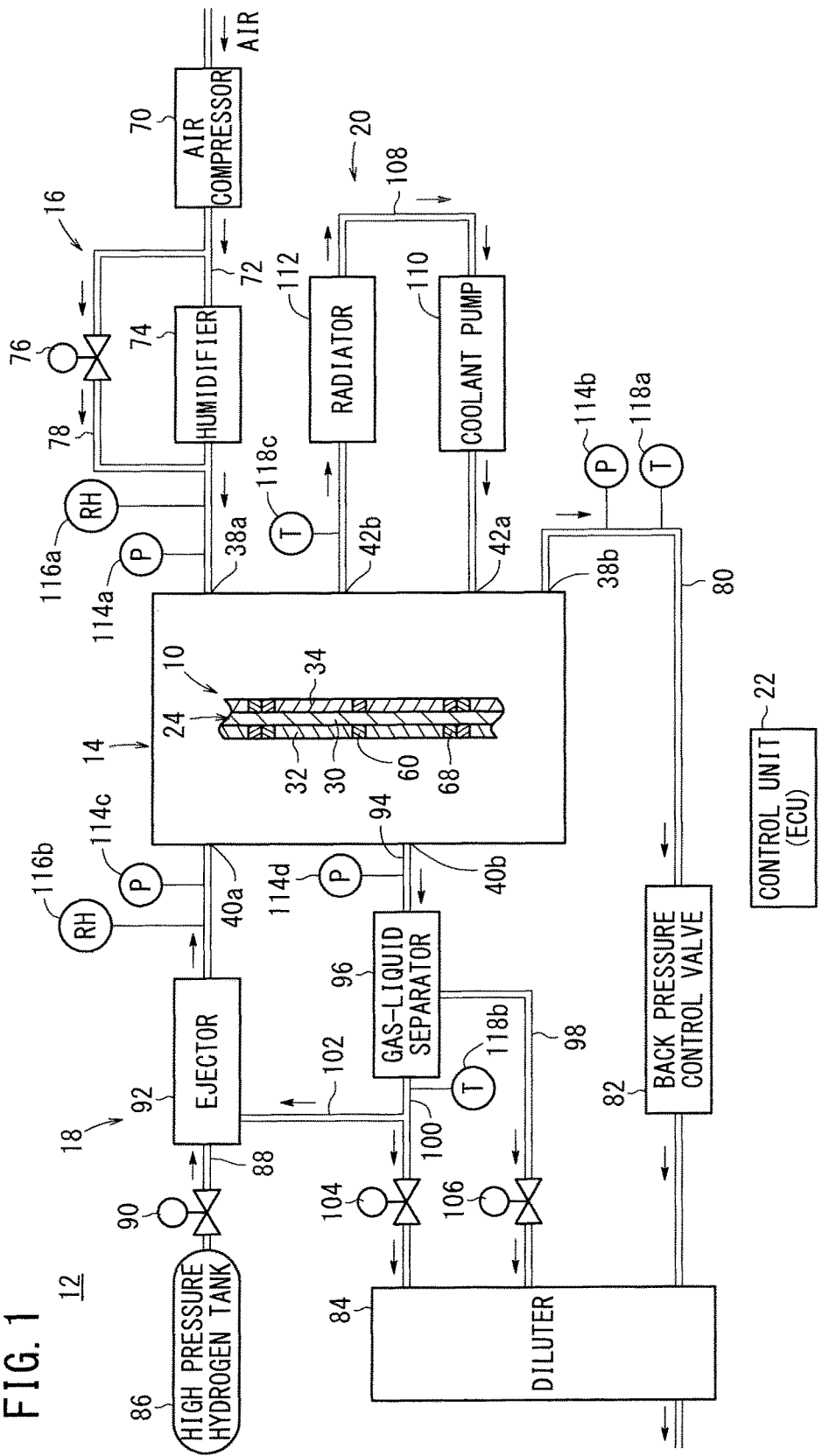
FIG. 1 is a diagram schematically showing structure of a fuel cell system in which a method of operating a fuel cell according to a first embodiment of the present invention is performed.

In FIG. 1, a fuel cell system 12 in which a method of operating a fuel cell 10 according to a first embodiment of the present invention is performed is a fuel cell system mounted in a vehicle. For example, the fuel cell system 12 is mounted in a fuel cell vehicle such as a fuel cell electric vehicle.

The fuel cell system 12 includes a fuel cell stack 14 formed by stacking a plurality of the fuel cells 10, an oxygen-containing gas supply apparatus 16 for supplying an oxygen-containing gas to the fuel cell stack 14, a fuel gas supply apparatus 18 for supplying a fuel gas to the fuel cell stack 14, a coolant supply apparatus 20 for supplying a coolant to the fuel cell stack 14, and a control unit (ECU) 22 for controlling the entire fuel cell system 12.

Figure 2:
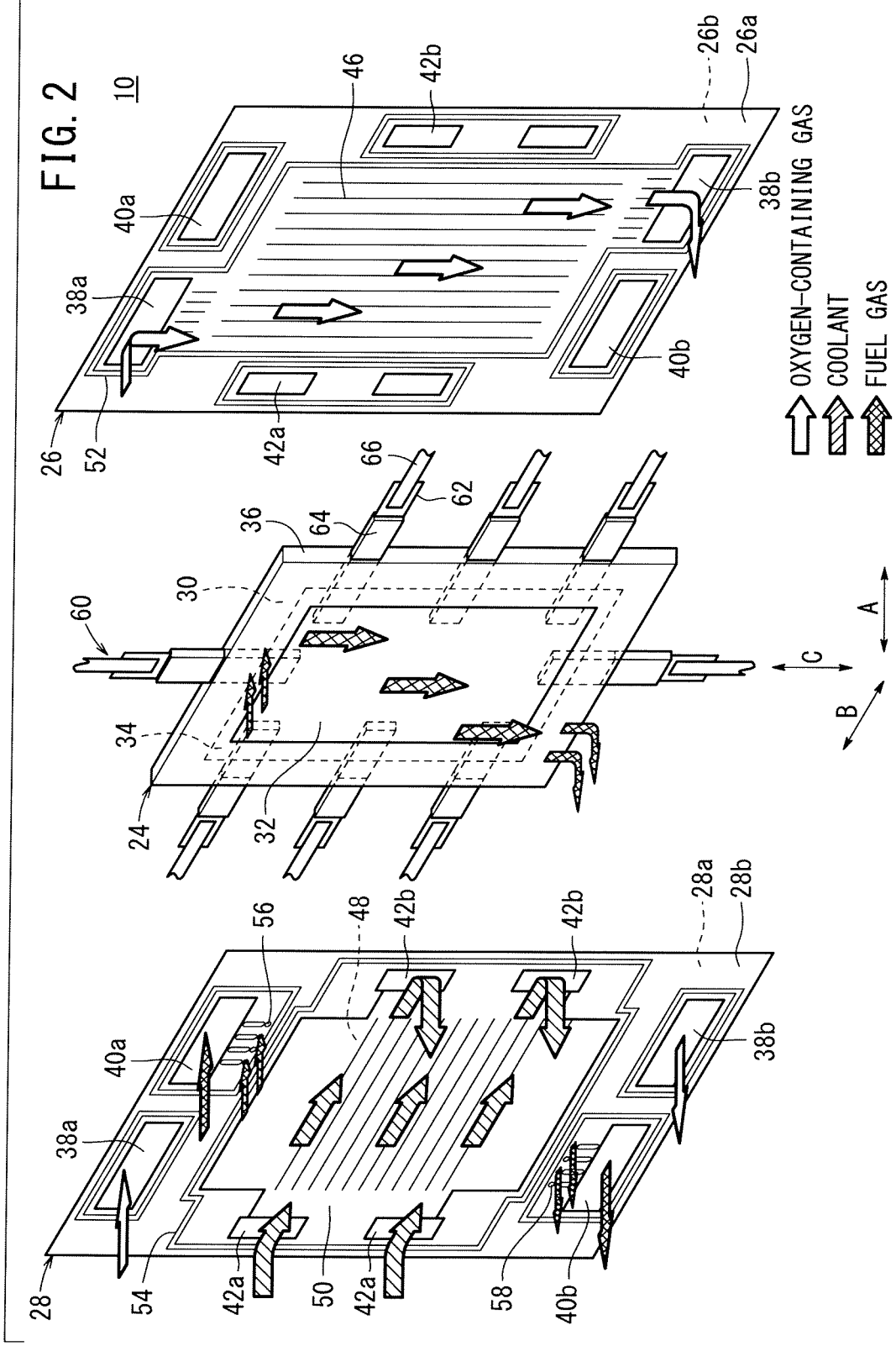
FIG. 2 is an exploded perspective view showing main components of the fuel cell.

As shown in FIG. 2, each of the fuel cells 10 includes a membrane electrode assembly 24 and a first separator 26 and a second separator 28 sandwiching the membrane electrode assembly 24. For example, the first separator 26 and the second separator 28 are made of metal plates such as steel plates, stainless steel plates, aluminum plates, plated steel sheets, or metal plates having anti-corrosive surfaces by surface treatment. Alternatively, carbon members may be used as the first separator 26 and the second separator 28.

Figure 3:
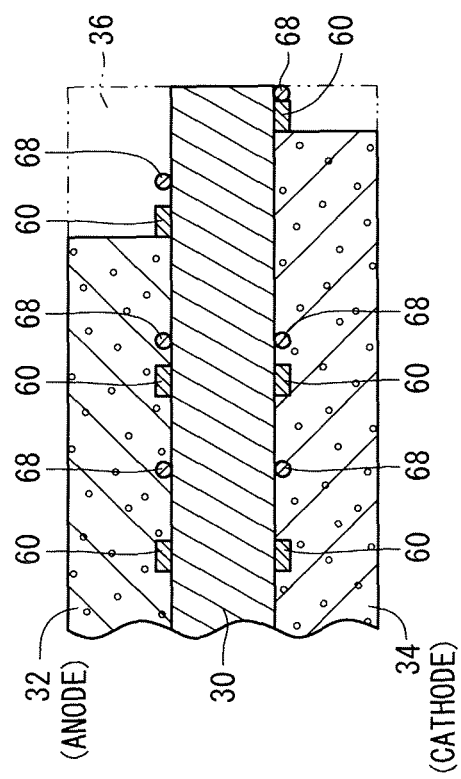
FIG. 3 is a cross sectional view showing a membrane electrode assembly of the fuel cell.

As shown in FIGS. 2 and 3, the membrane electrode assembly 24 includes an anode 32, a cathode 34, and a solid polymer electrolyte membrane 30 interposed between the anode 32 and the cathode 34. The solid polymer electrolyte membrane 30 is formed by impregnating a thin membrane of perfluorosulfonic acid with water, for example. A fluorine based electrolyte may be used as the solid polymer electrolyte membrane 30. Alternatively, an HC (hydrocarbon) based electrolyte may be used as the solid polymer electrolyte membrane 30.

For example, the outer end of the cathode 34 protrudes outward beyond the outer end of the anode 32, and the anode 32 is provided on one surface of the solid polymer electrolyte membrane 30. The anode 32 is not formed on the outer end of the solid polymer electrolyte membrane 30, and the outer end of the solid polymer electrolyte membrane 30 is exposed to the outside in a frame shaped area around the anode 32. The plane surface of the anode 32 and the plane surface of the solid polymer electrolyte membrane 30 may have the same size. The cathode 34 is provided on the other surface of the solid polymer electrolyte membrane 30. The outer end of the solid polymer electrolyte membrane 30 protrudes outward beyond the outer end of the cathode 34. It should be noted that the plane surface of the solid polymer electrolyte membrane 30 and the plane surface of the cathode 34 may have the same size.

Hereinafter, a method of producing the membrane electrode assembly 24 will be described. However, the present invention is not limited to this production method. The anode 32 includes an electrode catalyst layer joined to one surface of the solid polymer electrolyte membrane 30, and a gas diffusion layer stacked on the electrode catalyst layer. The cathode 34 includes an electrode catalyst layer joined to the other surface of the solid polymer electrolyte membrane 30, and a gas diffusion layer stacked on the electrode catalyst layer.

For example, each of the electrode catalyst layers is formed by carbon black supporting platinum particles or platinum alloy as catalyst particles. Alternatively, the electrode catalyst layer is formed by platinum black or platinum alloy. As an ion conductive binder, polymer electrolyte is used. Catalyst paste formed by mixing the catalyst particles uniformly in the solution of this polymer electrolyte is printed, applied, transferred, or sprayed on both surfaces of the solid polymer electrolyte membrane 30 to form the electrode catalyst layers. Alternatively, the catalyst paste may be applied to the gas diffusion layer, and then, the gas diffusion layer is joined to the solid polymer electrolyte membrane 30 together. Alternatively, a GDE (gas diffusion electrode) formed by attaching electrode catalyst to the gas diffusion layer may be provided on the solid polymer electrolyte membrane 30.

The membrane electrode assembly 24 includes a resin frame member 36 formed around the outer end of the solid polymer electrolyte membrane 30. For example, the resin frame member 36 is made of PPS (polyphenylene sulfide), PPA (polyphthalamide), LCP, PES, PEEK, or PFA. The resin frame member 36 may not be used.

As shown in FIG. 2, at an upper end of the fuel cell 10 in a vertical direction indicated by an arrow C, an oxygen-containing gas supply passage 38a for supplying an oxygen-containing gas and a fuel gas supply passage 40a for supplying a fuel gas such as a hydrogen containing gas are arranged in a horizontal direction indicated by an arrow B. The oxygen-containing gas supply passage 38a and the fuel gas supply passage 40a extend through the fuel cell 10 in a stacking direction indicated by an arrow A.

At a lower end of the fuel cell 10 in the direction indicated by the arrow C, a fuel gas discharge passage 40b for discharging the fuel gas and an oxygen-containing gas discharge passage 38b for discharging the oxygen-containing gas are arranged in the direction indicated by the arrow B. The fuel gas discharge passage 40b and the oxygen-containing gas discharge passage 38b extend through the fuel cell 10 in the direction indicated by the arrow A.

At one end of the fuel cell 10 in the direction indicated by the arrow B, a pair of coolant supply passages 42a for supplying a coolant are provided, and at the other end of the fuel cell 10 in the direction indicated by the arrow B, a pair of coolant discharge passages 42b for discharging the coolant are provided.

The first separator 26 has an oxygen-containing gas flow field 46 on its surface 26a facing the membrane electrode assembly 24. The oxygen-containing gas flow field 46 is connected to the oxygen-containing gas supply passage 38a and the oxygen-containing gas discharge passage 38b. The second separator 28 has a fuel gas flow field 48 on its surface 28a facing the membrane electrode assembly 24. The fuel gas flow field 48 is connected to the fuel gas supply passage 40a and the fuel gas discharge passage 40b. The oxygen-containing gas flows along the oxygen-containing gas flow field 46 and the fuel gas flow along the fuel gas flow field 48 vertically.

A coolant flow field 50 connecting the coolant supply passages 42a and the coolant discharge passages 42b is formed between a surface 26b of the first separator 26 opposite to the surface 26a, and a surface 28b of the second separator 28 opposite to the surface 28a. The coolant flows along the coolant flow field 50 in the horizontal direction.

A first seal member 52 is formed integrally with the surfaces 26a, 26b of the first separator 26, around the outer end of the first separator 26. A second seal member 54 is formed integrally with the surfaces 28a, 28b of the second separator 28, around the outer end of the second separator 28.

Each of the first seal member 52 and the second seal members 54 is made of seal material, cushion material, or packing material such as an EPDM (Ethylene Propylene Diene Monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

The second separator 28 has supply holes 56 connecting the fuel gas supply passage 40a to the fuel gas flow field 48, and discharge holes 58 connecting the fuel gas flow field 48 to the fuel gas discharge passage 40b.

A hydrogen peroxide concentration sensor 60 is provided directly on the membrane electrode assembly 24. For example, the hydrogen peroxide concentration sensor 60 is provided in the electrode surface of the anode 32, between the anode 32 and the solid polymer electrolyte membrane 30. A plurality of the hydrogen peroxide concentration sensors 60 may be provided along the outer end of the anode 32.

As shown in FIG. 3, the hydrogen peroxide concentration sensors 60 may be provided in the power generation area between the anode 32 and the solid polymer electrolyte membrane 30. Alternatively, the hydrogen peroxide concentration sensors 60 may be provided in the power generation area between the cathode 34 and the solid polymer electrolyte membrane 30, at an end of the anode 32 or at an end of the cathode 34, or in the solid polymer electrolyte membrane 30.

Figure 4:
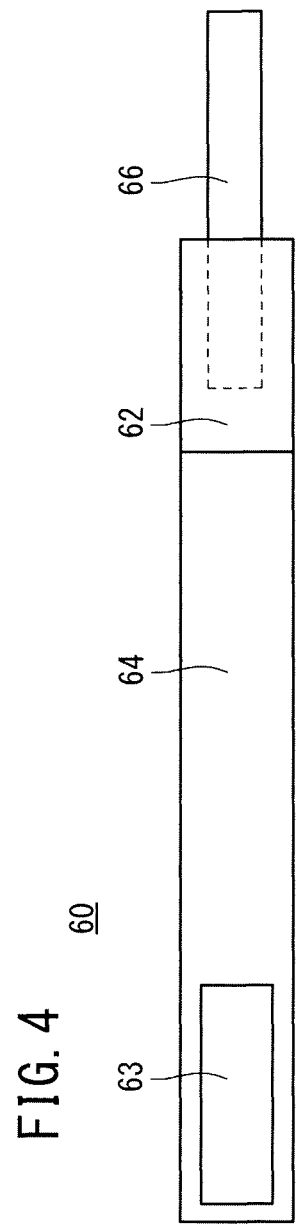
FIG. 4 is view showing a hydrogen peroxide concentration sensor included in the membrane electrode assembly, for detecting hydrogen peroxide concentration.

As shown in FIGS. 2 and 4, for example, the hydrogen peroxide concentration sensor 60 includes a Pt electrode 62 in a form of an elongated thin plate, and an insulating membrane 64 formed on the Pt electrode 62. For example, the Pt electrode 62 may be formed by plating, spattering, ion beam assistance or the like. The Pt electrode 62 has a thickness in a range of 1 μm to 50 μm. The insulating membrane 64 has insulating property, and has good hot water resistance, good acid resistance, and good heat resistance. The insulating membrane 64 is made of flexible material. For example, the insulating membrane 64 is made of perfluorosulfonic acid based resin, polystyrene, polytetrafluoroethylene (PTFE), liquid crystal polymer (LCP), polyimide, fluorine based electrolyte membrane, and hydrocarbon based electrolyte membrane or the like. Preferably, the insulating membrane 64 has a thickness of 5 μm or more. The shape of the Pt electrode 62 is not limited to the elongated shape. The portion of the Pt electrode 62 covered by the insulating membrane 64 is not limited to Pt. For example, only the front end (detection portion 63 as described later) may be made of Pt, and the other portion may be made of carbon material.

At a front end of the Pt electrode 62, a detection portion 63 is provided by cutting an area in one surface of the insulating membrane 64. For example, the detection portion 63 has an effective cross sectional area of 2 mm$^2$ to 40 mm$^2$. The surface of the detection portion 63 protrudes outward beyond the insulating membrane 64 in the thickness direction, and the detection portion 63 can contact the solid polymer electrolyte membrane 30. The surface of the detection portion 63 may be covered by a fluorine based electrolyte membrane or a hydrocarbon based electrolyte membrane, and the like. One end of an electrically conductive line 66 is connected to a rear end of the Pt electrode 62, and the other end of the electrically conductive line 66 is connected to the control unit 22.

As described below, the hydrogen peroxide concentration sensor 60 can adopt various kinds of structure. The shape of the hydrogen peroxide concentration sensor 60 is not limited to the structure described below.

Figure 5:
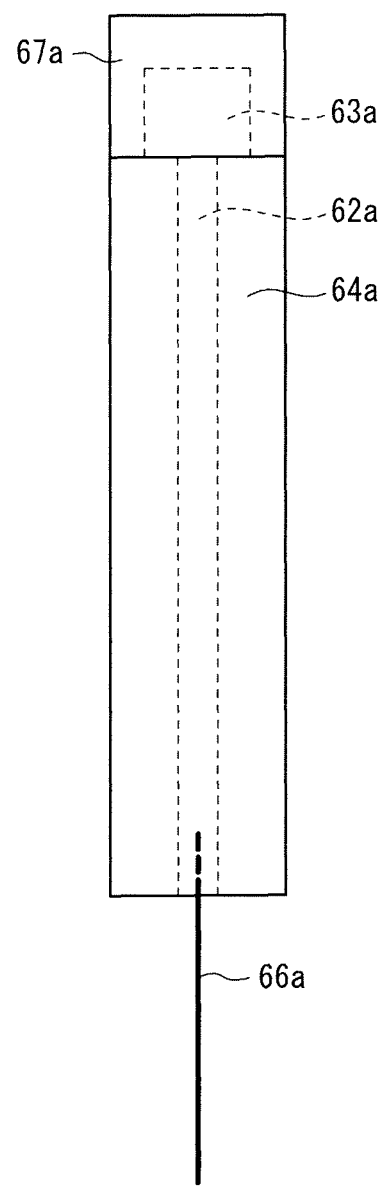
FIG. 5 is a front view showing another hydrogen peroxide concentration sensor.
Figure 6:
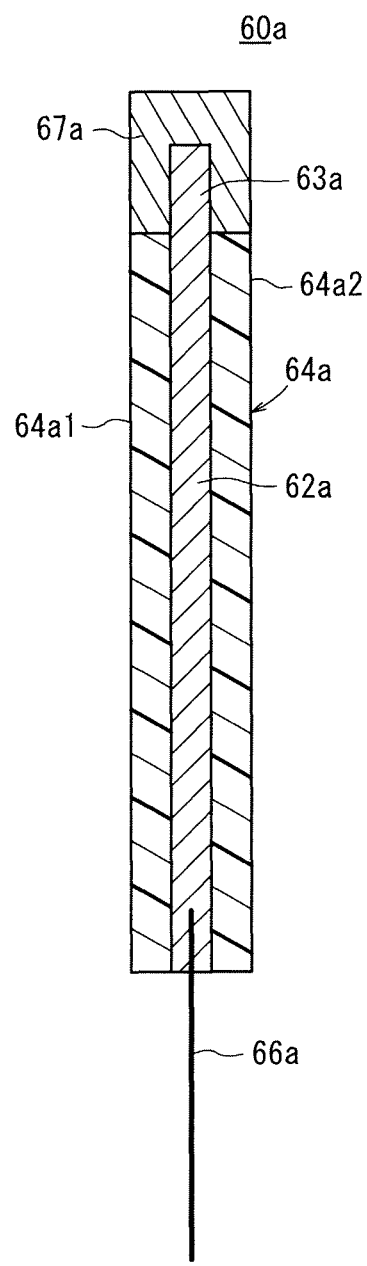
FIG. 6 is a cross sectional view showing the other hydrogen peroxide concentration sensor.

A hydrogen peroxide concentration sensor 60a shown in FIGS. 5 and 6 has a Pt electrode 62a, and a detection portion 63a having a large plane surface is provided at one end of the Pt electrode 62a. It is preferable to configure the surface area of the detection portion 63a to have a sufficient size for reducing the amount of Pt to be used. The detection portion 63a of the Pt electrode 62a is exposed to the outside, and the Pt electrode 62a is covered by an insulating membrane 64a. The insulating membrane 64a includes two polyimide sheets 64a1, 64a2, and the insulating membrane 64a and the Pt electrode 62a are combined together such that, e.g., the Pt electrode 62a is sandwiched between the polyimide sheets 64a1, 64a2. The detection portion 63a is covered by a membrane layer 67a of an ion exchange membrane such as a fluorine based electrolyte membrane or a hydrocarbon based electrolyte membrane. An electrically conductive line 66a such as a copper line is connected to the other end of the Pt electrode 62a.

Figure 7:
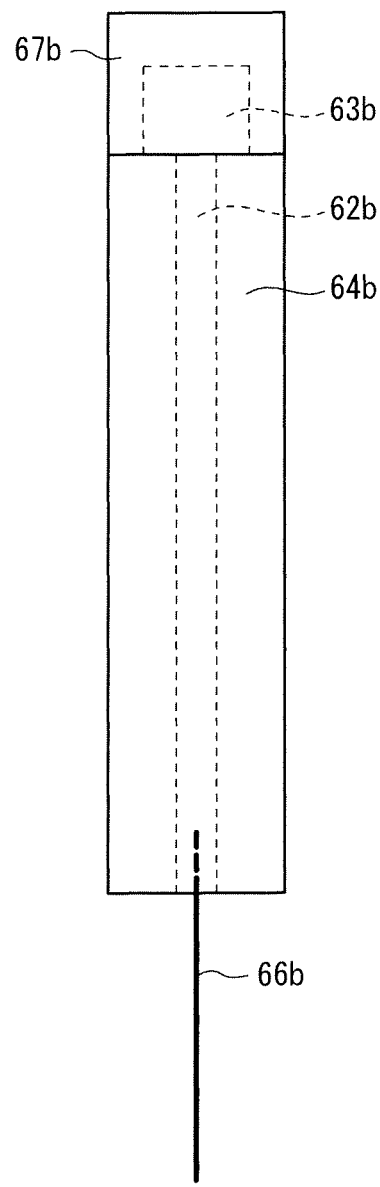
FIG. 7 is a front view showing another hydrogen peroxide concentration sensor.
Figure 8:
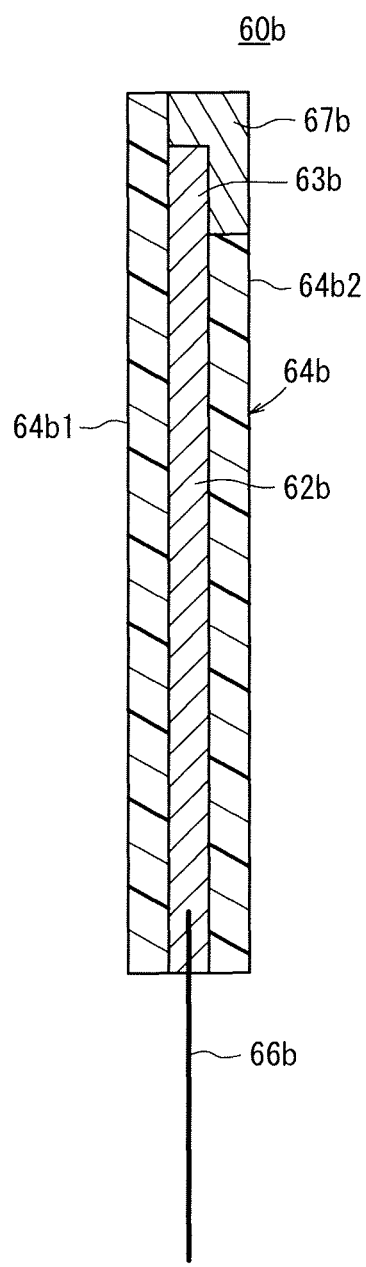
FIG. 8 is a cross sectional view showing the other hydrogen peroxide concentration sensor.

As shown in FIGS. 7 and 8, a hydrogen peroxide concentration sensor 60b includes a Pt electrode 62b, and a detection portion 63b having a large planar surface is provided at one end of the Pt electrode 62b. An electrically conductive line 66b is connected to the other end of the Pt electrode 62b. The Pt electrode 62b is covered by an insulating membrane 64b. The insulating membrane 64b includes two polyimide sheets 64b1, 64b2 having different lengths, and the insulating membrane 64b and the Pt electrode 62b are combined together such that, e.g., the Pt electrode 62b is sandwiched between the polyimide sheets 64b1, 64b2.

The polyimide sheet 64b1 is longer than the polyimide sheet 64b2. The polyimide sheet 64b1 is longer than the Pt electrode 62b, and covers one surface of the detection portion 63b. The other surface of the detection portion 63b is exposed to the outside from the polyimide sheet 64b2. The detection portion 63b is covered from the end of the polyimide sheet 64b2 side by a membrane layer 67b of an ion exchange membrane such as a fluorine based electrolyte membrane or a hydrocarbon based electrolyte membrane.

In the hydrogen peroxide concentration sensor 60b, the membrane layer 67b may be positioned between the anode 32 and the solid polymer electrolyte membrane 30 to face the solid polymer electrolyte membrane 30 or to face the anode 32. Alternatively, the membrane layer 67b may be positioned between the cathode 34 and the solid polymer electrolyte membrane 30.

Figure 9:
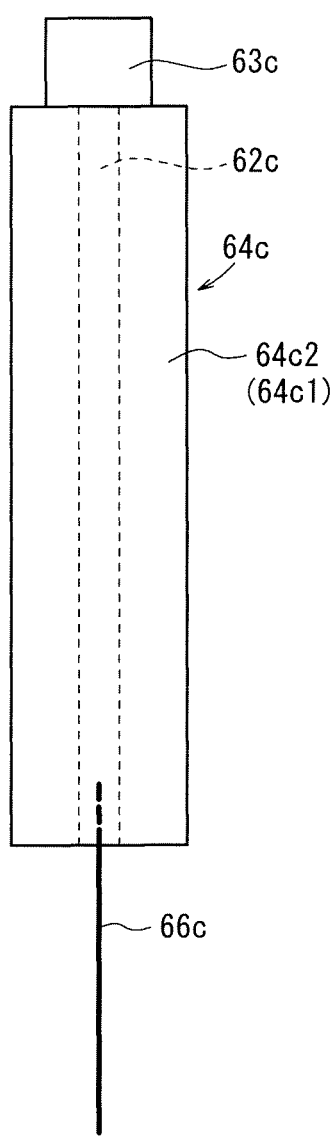
FIG. 9 is a front view showing still another hydrogen peroxide concentration sensor.
Figure 10:
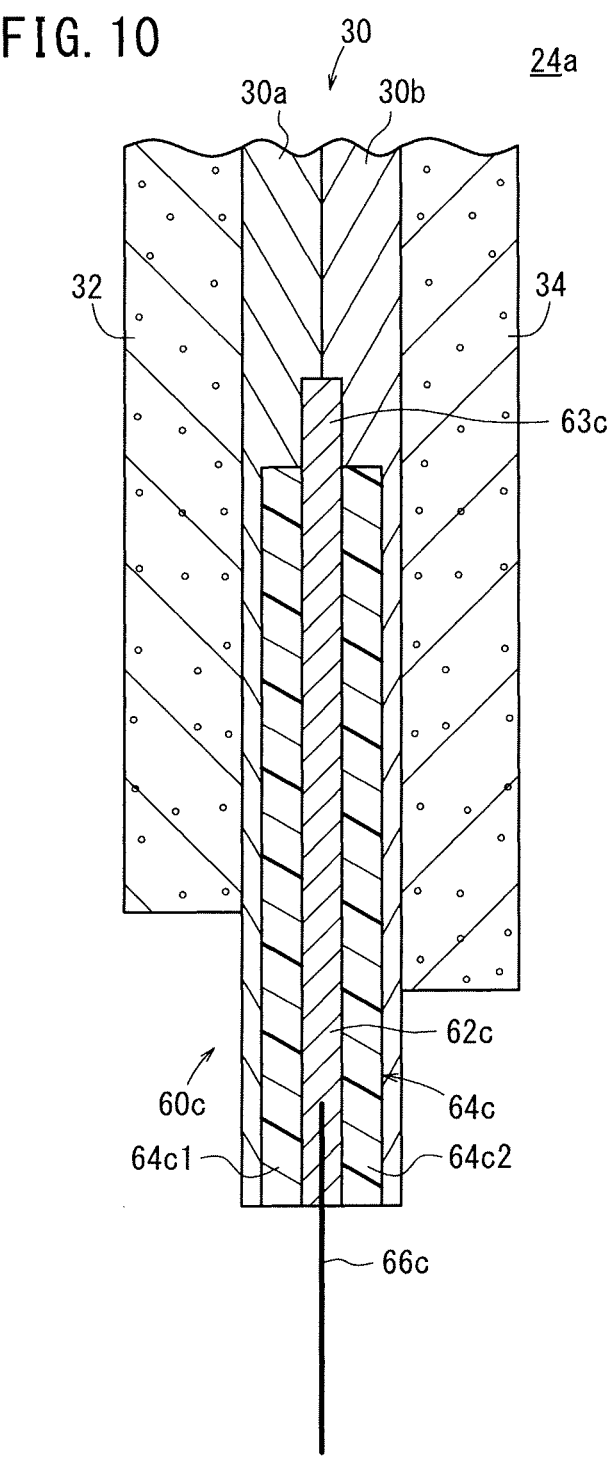
FIG. 10 is a cross sectional view showing a membrane electrode assembly including the still other hydrogen peroxide concentration sensor.

As shown in FIGS. 9 and 10, a hydrogen peroxide concentration sensor 60c includes a Pt electrode 62c, and a detection portion 63c having a large planar surface is provided at one end of the Pt electrode 62c. An electrically conductive line 66c is connected to the other end of the Pt electrode 62c. A portion of the Pt electrode 62c other than the detection portion 63c is covered by an insulating membrane 64c. The insulating membrane 64c includes polyimide sheets 64c1, 64c2, and the insulating membrane 64c and the Pt electrode 62c are combined together such that, e.g., the Pt electrode 62c is sandwiched between the polyimide sheets 64c1, 64c2.

As shown in FIG. 10, a solid polymer electrolyte membrane 30 of a membrane electrode assembly 24a is formed by joining two membrane members 30a, 30b, and the hydrogen peroxide concentration sensor 60c is sandwiched between the membrane members 30a, 30b.

Figure 11:
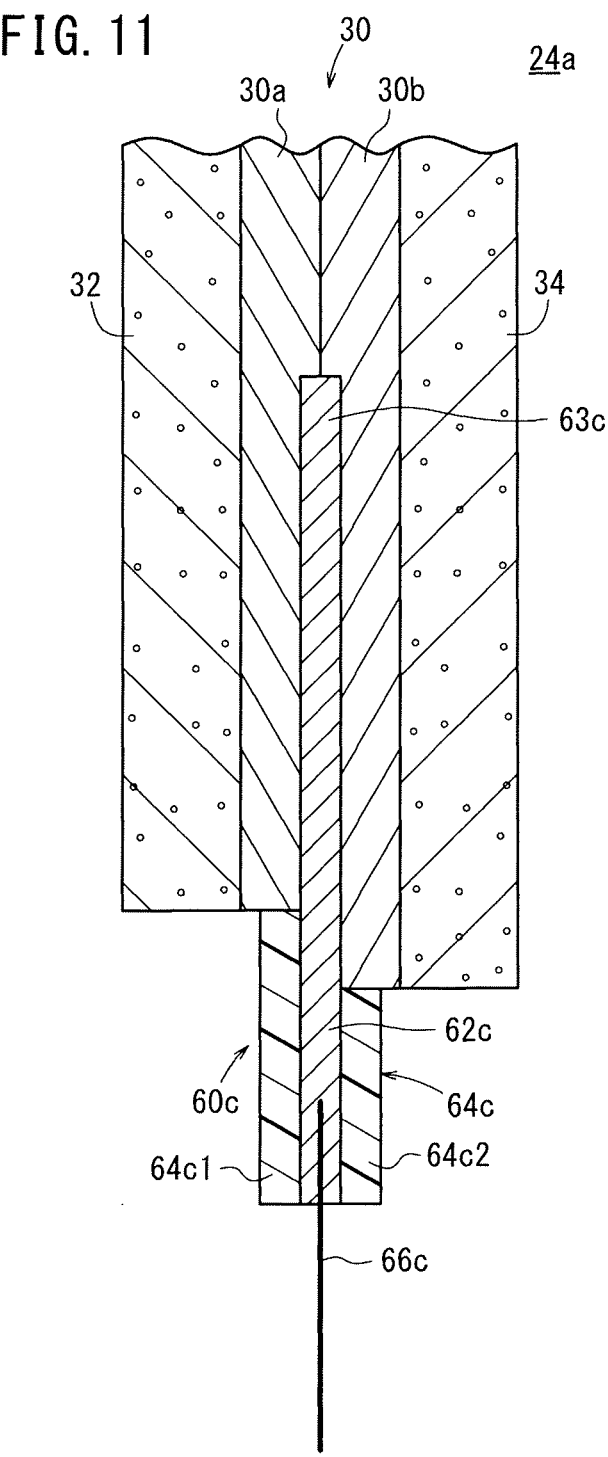
FIG. 11 is a cross sectional view showing another type of membrane electrode assembly shown in FIG. 10.

In FIG. 10, the insulating membrane 64c is sandwiched between the membrane members 30a, 30b. However, the present invention is not limited in this respect. For example, as shown in FIG. 11, only the Pt electrode 62c may be sandwiched between the membrane members 30a, 30b, and the insulating membrane 64c may be provided outside the membrane members 30a, 30b.

In the present invention, any of the hydrogen peroxide concentration sensors 60, 60a, 60b, 60c may be used, and in embodiments described below, the sensor is simply referred to as the hydrogen peroxide concentration sensor 60.

As shown in FIG. 3, electric potential sensors 68 are provided in the membrane electrode assembly 24 as necessary. As in the case of the hydrogen peroxide concentration sensors 60, the electric potential sensors 68 may be provided at a plurality of positions to detect the electric potential at each of the positions, and a signal indicative of the detected electric potential is transmitted to the control unit 22.

As shown in FIG. 1, the oxygen-containing gas supply apparatus 16 includes an air compressor (pump) 70 for compressing and supplying the atmospheric air, and the air compressor 70 is provided in an air supply channel 72. A humidifier 74, and a bypass channel 78 bypassing the humidifier 74 through a valve 76 are provided in the air supply channel 72. The air supply channel 72 is connected to the oxygen-containing gas supply passage 38a of the fuel cell stack 14. An air discharge channel 80 is connected to the oxygen-containing gas discharge passage 38b of the fuel cell stack 14. The air discharge channel 80 is connected to a diluter 84 through a back pressure control valve 82.

The fuel gas supply apparatus 18 includes a high pressure hydrogen tank 86 for storing high pressure hydrogen, and the high pressure hydrogen tank 86 is connected to the fuel gas supply passage 40a of the fuel cell stack 14 through a hydrogen supply channel 88. A valve 90 and an ejector 92 are provided in the hydrogen supply channel 88.

An off gas channel 94 is connected to the fuel gas discharge passage 40b of the fuel cell stack 14. The off gas channel 94 is connected to a gas-liquid separator 96, and the gas-liquid separator 96 is connected to a drain channel 98 for discharging liquid component and a gas channel 100 for discharging gas component. The gas channel 100 is connected to the ejector 92 through a circulation channel 102. When a purge valve 104 is opened, the gas channel 100 is connected to the diluter 84. The drain channel 98 is connected to the diluter 84 through a valve 106.

The coolant supply apparatus 20 includes a coolant circulation channel 108 connected to the coolant supply passage 42a and the coolant discharge passage 42b of the fuel cell stack 14 for supplying the coolant by circulation. A coolant pump 110 and a radiator 112 are provided in the coolant circulation channel 108. The coolant pump 110 is provided adjacent to the coolant supply passage 42a, and the radiator 112 is provided adjacent to the coolant discharge passage 42b.

Pressure meters 114a, 114b, 114c, 114d are provided in the air supply channel 72, the air discharge channel 80, the hydrogen supply channel 88, and the off gas channel 94, respectively. Hygrometers 116a, 116b are provided in the air supply channel 72 and the hydrogen supply channel 88, respectively. Thermometers 118a, 118b, 118c are provided in the air discharge channel 80, the gas channel 100, and the coolant circulation channel 108, respectively.

Operation of the fuel cell system 12 will be described below.

As shown in FIG. 1, an oxygen-containing gas (air) is supplied to the air supply channel 72 through the air compressor 70 of the oxygen-containing gas supply apparatus 16. After the oxygen-containing gas is humidified through the humidifier 74 or the oxygen-containing gas bypasses the humidifier 74 through the bypass channel 78, the oxygen-containing gas is supplied to the oxygen-containing gas supply passage 38a of the fuel cell stack 14.

In the fuel gas supply apparatus 18, when the valve 90 is opened, a fuel gas (hydrogen gas) is supplied to the hydrogen supply channel 88 from the high pressure hydrogen tank 86. After the fuel gas flows through the ejector 92, the fuel gas is supplied to the fuel gas supply passage 40a of the fuel cell stack 14.

In the coolant supply apparatus 20, by operation of the coolant pump 110, a coolant such as pure water, ethylene glycol, or oil is supplied to the coolant supply passage 42a of the fuel cell stack 14 from the coolant circulation channel 108.

As shown in FIG. 2, the oxygen-containing gas flows from the oxygen-containing gas supply passage 38a into the oxygen-containing gas flow field 46 of the first separator 26. The oxygen-containing gas moves in the direction indicated by the arrow C, and the oxygen-containing gas is supplied to the cathode 34 of the membrane electrode assembly 24 for inducing an electrochemical reaction at the cathode 34. In the meanwhile, the fuel gas flows from the fuel gas supply passage 40a flows through the supply holes 56 into the fuel gas flow field 48 of the second separator 28. The fuel gas moves along the fuel gas flow field 48 in the direction indicated by the arrow C, and the fuel gas is supplied to the anode 32 of the membrane electrode assembly 24 for inducing an electrochemical reaction at the anode 32.

Thus, in each of the membrane electrode assemblies 24, the oxygen-containing gas supplied to the cathode 34, and the fuel gas supplied to the anode 32 are partially consumed in the electrochemical reactions at catalyst layers of the cathode 34 and the anode 32 for generating electricity.

Then, the oxygen-containing gas partially consumed at the cathode 34 is discharged along the oxygen-containing gas discharge passage 38b in the direction indicated by the arrow A. Likewise, the fuel gas partially consumed at the anode 32 flows through the discharge holes 58, and then, the fuel gas is discharged along the fuel gas discharge passage 40b in the direction indicated by the arrow A.

Further, the coolant supplied to the coolant supply passage 42a flows into the coolant flow field 50 between the first separator 26 and the second separator 28, and then, the coolant flows in the direction indicated by the arrow B. After the coolant cools the membrane electrode assembly 24, the coolant is discharged from the coolant discharge passage 42b.

As shown in FIG. 1, the oxygen-containing gas discharged into the oxygen-containing gas discharge passage 38b flows through the air discharge channel 80, and then, flows into the diluter 84. In the meanwhile, the off gas (partially consumed fuel gas) discharged into the fuel gas discharge passage 40b flows from the off gas channel 94 into the gas-liquid separator 96. After water content is removed, the off gas is sucked into the ejector 92 from the gas channel 100 through the circulation channel 102.

Further, the coolant discharged into the coolant discharge passage 42b flows through the coolant circulation channel 108, and the coolant is cooled by the radiator 112. Further, by operation of the coolant pump 110, the coolant is supplied to the fuel cell stack 14 by circulation.

Next, the operating method according to the first embodiment of the present invention will be described below.

Figure 12:
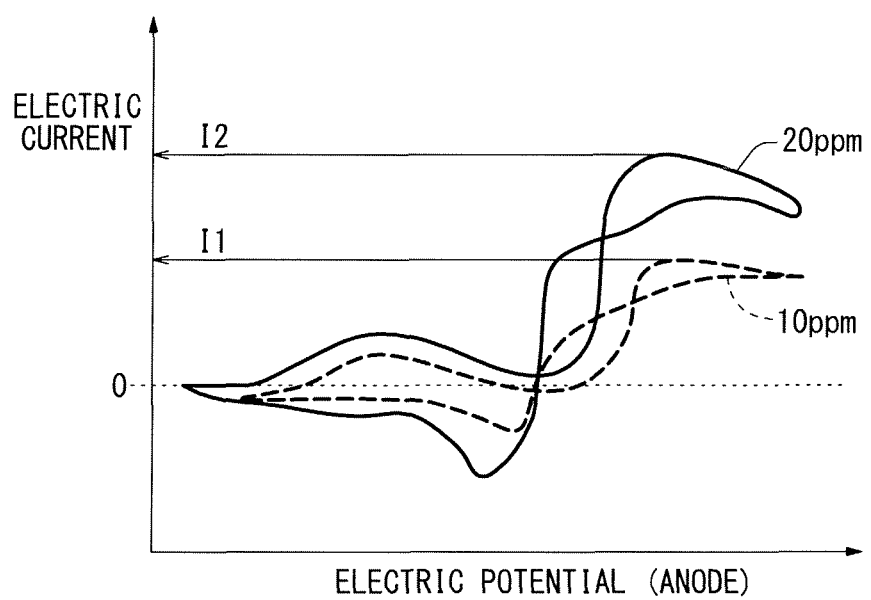
FIG. 12 is graph showing calibration curves.

Firstly, by the hydrogen peroxide concentration sensor 60 directly attached to the membrane electrode assembly 24, in order to measure the hydrogen peroxide concentration, using electrochemical measurements, a cyclic voltammogram (current versus electric potential curve) shown in FIG. 12 was obtained. Specifically, the horizontal axis corresponds to the applied electric potential, and the vertical axis corresponds to the response current. The cyclic voltammetry (CV) was evaluated based on the different hydrogen peroxide concentration.

Figure 13:
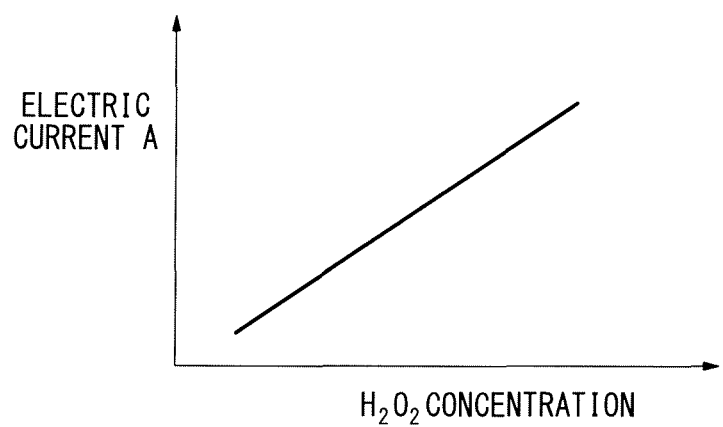
FIG. 13 is a graph showing the relationship between the hydrogen peroxide concentration and the electric current.

As a result, in addition to a calibration curve (see FIG. 13) relative to oxidation current at each hydrogen peroxide concentration, various power generation conditions were obtained. For example, the highest oxidation current value I1 at hydrogen peroxide concentration of 10 ppm was obtained, and the highest oxidation current value I2 at hydrogen peroxide concentration of 20 ppm was obtained. As shown in FIG. 14, the obtained operating conditions (I, II, III, IV, i, ii, iii, iv) of the fuel cell 10 are stored in a memory of the control unit 22 as a map corresponding to hydrogen peroxide concentrations (a, b, c, d).

For example, the operating conditions include the flow rate, the dew point, and the pressure of the oxygen-containing gas supplied to the fuel cell stack 14, the flow rate, the dew point, and the pressure of the oxygen-containing gas discharged from the fuel cell stack 14, the flow rate, the dew point, and the pressure of the fuel gas supplied to the fuel cell stack 14, the flow rate, the dew point, and the pressure of the off gas (fuel gas) discharged from the fuel cell stack 14, the temperature of the coolant supplied to the fuel cell stack 14, and the temperature of the coolant discharged from the fuel cell stack 14.

During power generation of the fuel cell system 12, the control unit 22 measures, and keeps track of the hydrogen peroxide concentration calculated from the electric current detected by the hydrogen peroxide concentration sensors 60. One or a plurality of the hydrogen peroxide concentration sensors 60 are provided. Among hydrogen peroxide concentrations detected by the hydrogen peroxide concentration sensors 60, the hydrogen peroxide concentration having the largest variation is adopted. The position of the membrane electrode assembly 24 having the largest hydrogen peroxide variation may change depending on the power generation conditions. Further, the hydrogen peroxide concentration sensor 60 may be provided only at one position where, empirically, the hydrogen peroxide concentration can be detected most efficiently. The hydrogen peroxide concentration having the highest value may be adopted.

Figure 15:
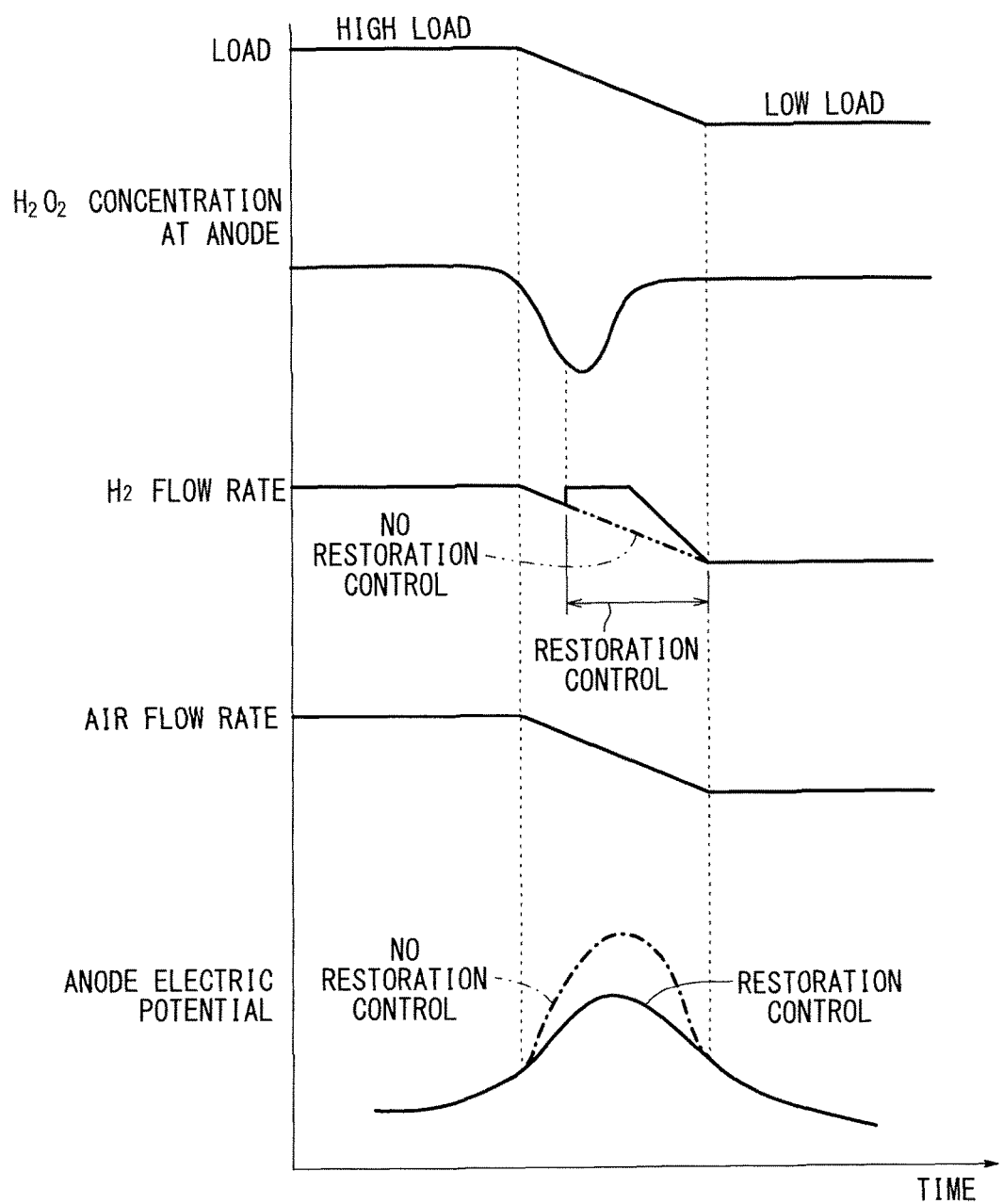
FIG. 15 is a timing chart showing the control for changing from high load power generation conditions to low load power generation conditions.

For example, as shown in FIG. 15, in the case where high load and high flow rate power generation conditions are changed to low load and low flow rate power generation conditions, as a result of the decrease in the amount of the fuel gas at the anode and the relative increase in the proportion of the oxygen, the electric potential becomes high in some portions, and the hydrogen peroxide concentration tends to be decreased easily.

Figure 16:
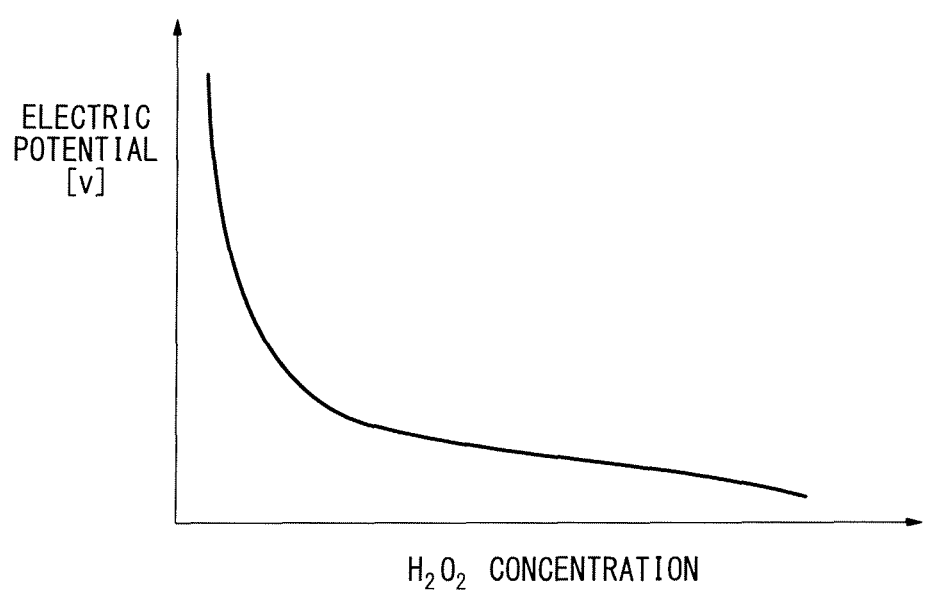
FIG. 16 is a graph showing the relationship between the electric potential and the hydrogen peroxide concentration.

The relationship between the hydrogen peroxide concentration ($H_2O_2$ %) and the electric potential (fuel cell voltage) is shown in FIG. 16. This relationship is stored as the map in the memory of the control unit 22. The fuel cell 10 is controlled based on the fuel cell voltage obtained from this map. The map is corrected to have optimum values in correspondence with the shapes of gas flow fields of the fuel cell 10, characteristics of the membrane electrode assembly 24, shapes of the first separator 26 and the second separator 28, and the shapes of the fluid passages.

As shown in FIG. 16, in the low electric potential range, the amount of the generated hydrogen peroxide is increased. Therefore, as shown in FIG. 15, during transition from the high load power generation conditions to the low load power generation conditions, if the flow rate of the supplied fuel gas is decreased, the electric potential is increased, and active substances such as radical or the like tend to be generated easily from the hydrogen peroxide.

In this regard, in the first embodiment, when decrease in the hydrogen peroxide concentration is detected by the hydrogen peroxide concentration sensor 60, the control unit 22 implements control to increase the fuel gas flow rate based on the map (see FIG. 14) which has been stored beforehand. Specifically, in a relatively low electric potential range where the hydrogen peroxide concentration is not decreased, control to increase the flow rate of the fuel gas based on the map of the fuel gas amount (restoration control) is implemented. In this manner, generation of active substances is suppressed suitably without occurrence of the rapid increase in the anode electric potential.

Figure 17:
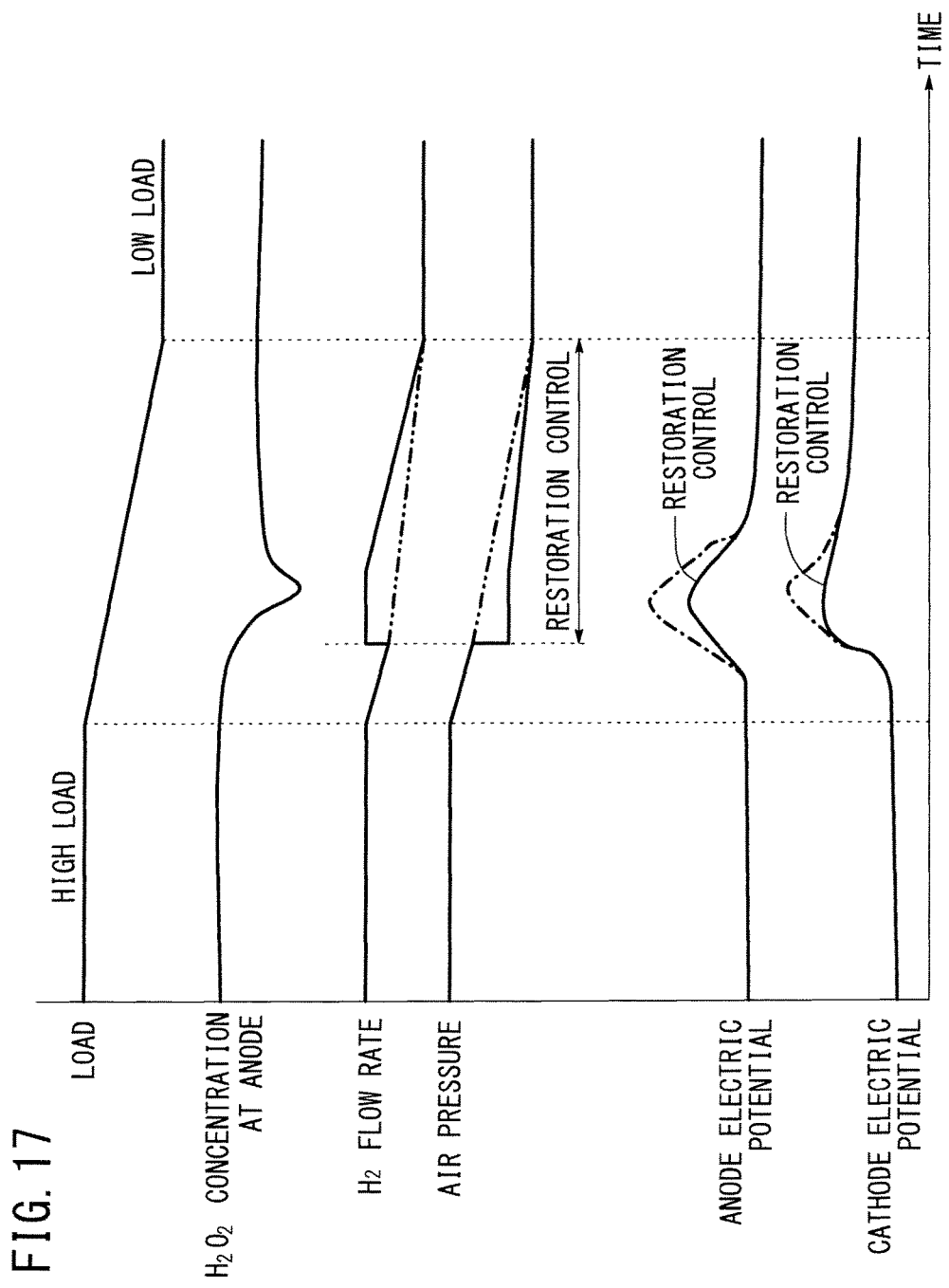
FIG. 17 is a timing chart of another operating method.

Further, control to decrease the oxygen-containing gas pressure based on the map of the oxygen-containing gas amount (restoration control) may be implemented. As shown in FIG. 17, by decreasing the oxygen-containing gas pressure, increase in the cathode electric potential can be suppressed. Thus, the cathode potential is not increased rapidly to a high electric potential. Therefore, it becomes possible to suitably suppress generation of active substances.

Figure 18:
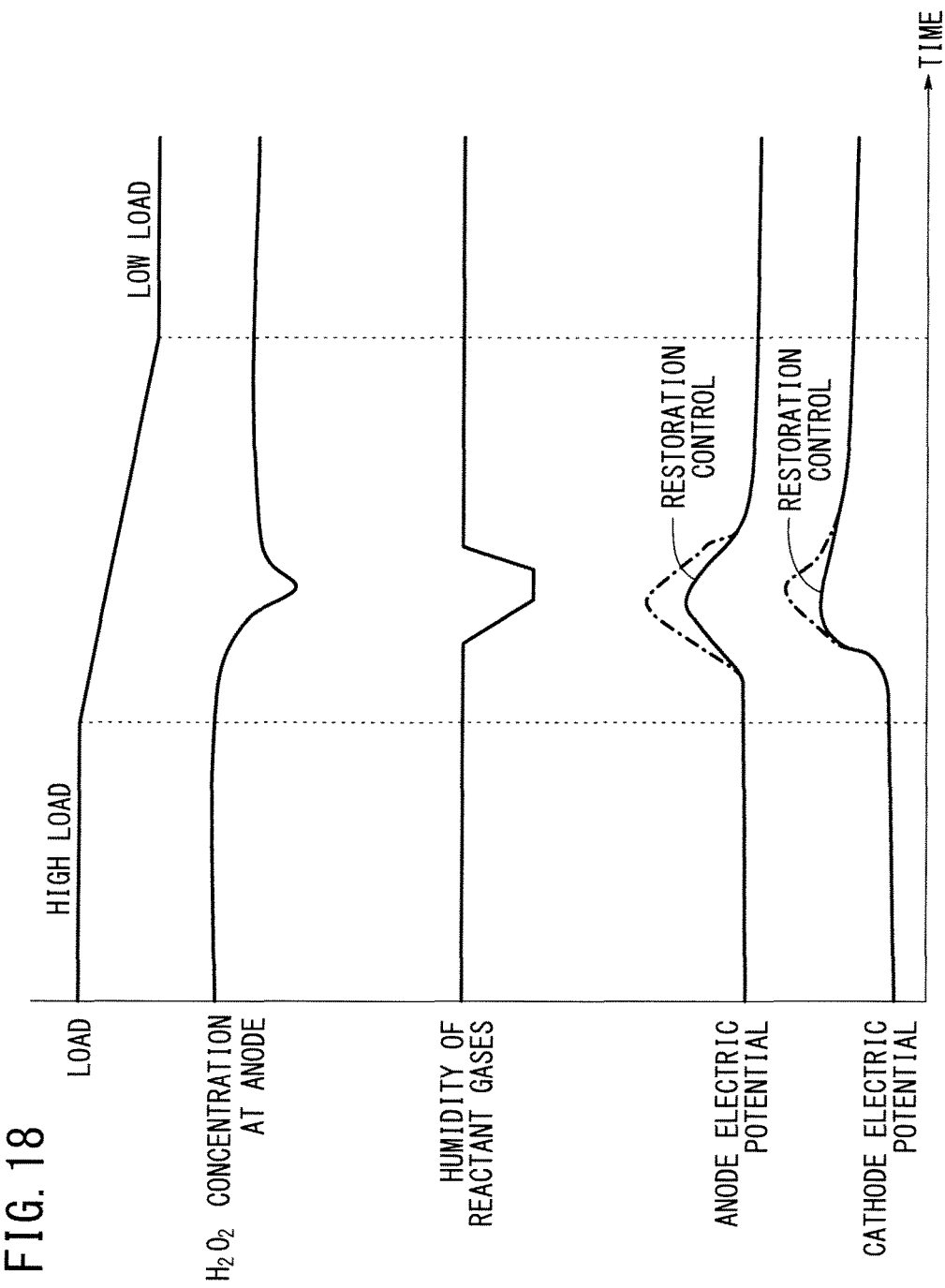
FIG. 18 is a timing chart of another operating method.

Further, as shown in FIG. 18, when the hydrogen peroxide concentration is decreased, by decreasing the humidity of reactant gases supplied to the cathode and the anode, decrease in the hydrogen peroxide concentration can be suppressed. Thus, it becomes possible to suppress the increase in the anode electric potential and the cathode electric potential.

Further, at the time of changing from the low load and low flow rate power generation conditions to the high load and high flow rate power generation conditions, if the hydrogen peroxide concentration is rapidly decreased, then by increasing the hydrogen flow rate, it is possible to restore the hydrogen peroxide concentration to normal concentration. Alternatively, for restoring the hydrogen peroxide concentration to the normal concentration, for example, the humidity of the reactant gas supplied to the cathode may be decreased.

The stack body may include a plurality of membrane electrode assemblies each having the hydrogen peroxide concentration sensor 60. Further, the hydrogen peroxide concentration sensor 60 is not limited to the above described embodiments. Sensors based on other detection principles may be used.

In the fuel cell system 12, even if power generation continues under the same power generation conditions, water condensation may occur due to disturbance or the like. This condensed water may cause changes in the electric potential, and as a consequence, changes in the hydrogen peroxide concentration. Further, the condensed water may cause generation of active substances.

Figure 19:
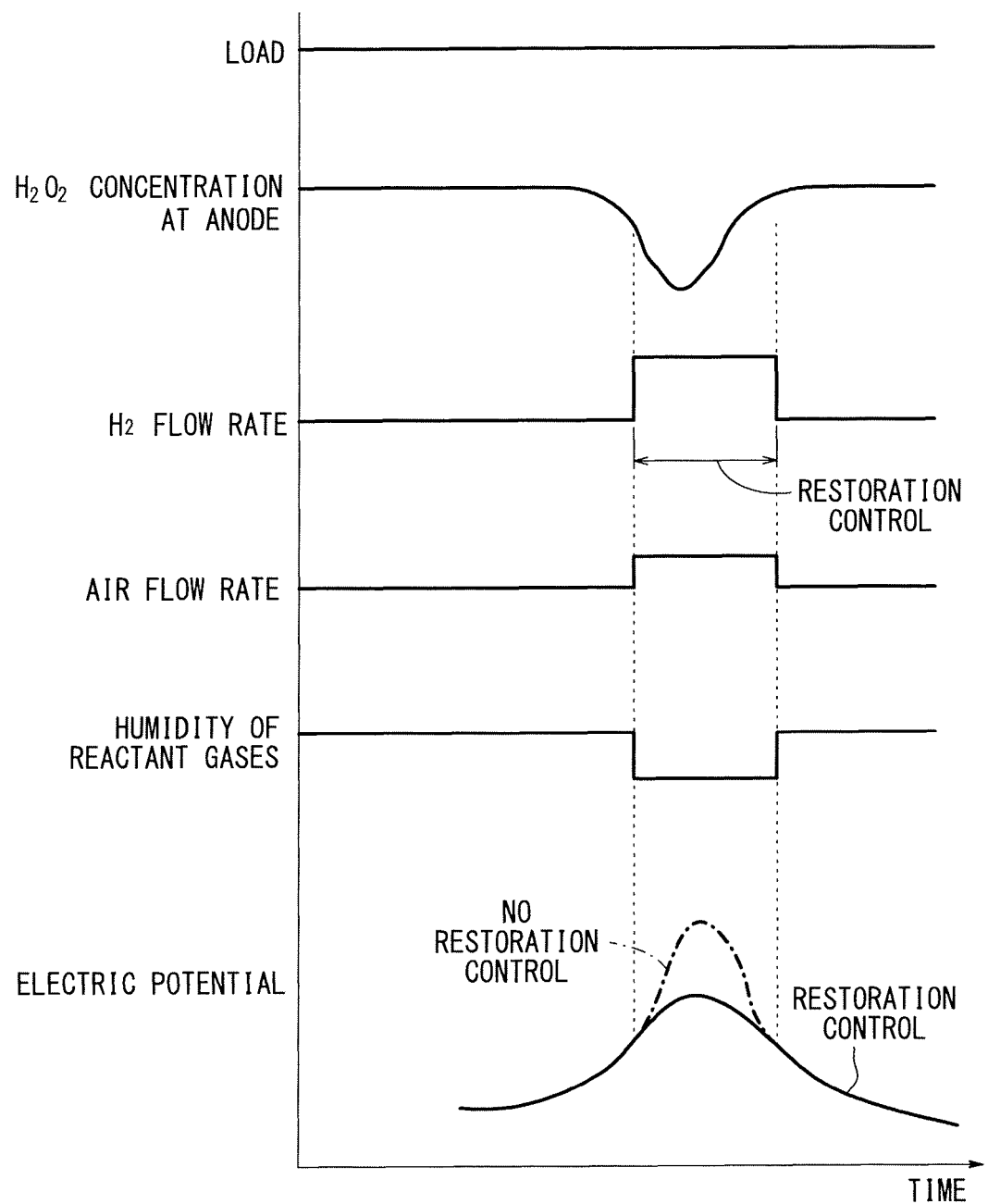
FIG. 19 is a timing chart showing control when the hydrogen peroxide concentration is decreased under the same power generation conditions.

Therefore, in the operating method according to the second embodiment of the present invention, control shown in FIG. 19 is implemented. That is, during steady power generation operation, for example, if water condensation occurs in the gas channel, and a change in the hydrogen peroxide concentration is detected, desired operation control is implemented based on a map (see FIG. 14) which has been stored beforehand. Specifically, when decrease in the hydrogen peroxide concentration is detected, in order to suppress the increase in the electric potential, for example, control to increase the flow rate of the fuel gas, control to increase the flow rate of the oxygen-containing gas, control to decrease the humidity of the reactant gases supplied to the cathode and the anode, and additionally, though not shown, control to increase the coolant temperature are implemented in combination (restoration control). Therefore, it is possible to effectively suppress generation of active substances due to the increase in the electric potential resulting from the decrease in the hydrogen peroxide concentration.

Further, in the membrane electrode assembly 24, the electric potential sensor 68 is provided as necessary. Therefore, when power generation is performed in the low electric potential range where generation of hydrogen peroxide is increased rapidly, by changing the operating conditions, it becomes possible to suppress the rapid increase in hydrogen peroxide (see FIG. 16).

In this case, in the fuel cell system 12, a plurality of hydrogen peroxide concentration sensors 60 are directly provided on the membrane electrode assemblies 24. In the structure, it is possible to promptly and reliably detect the concentration of hydrogen peroxide generated in various positions of the membrane electrode assembly 24. Thus, it becomes possible to reliably detect the hydrogen peroxide concentration in real time, effectively suppress degradation of components such as the solid polymer electrolyte membrane 30, and control the fuel cell 10 in a suitable state.

Further, as shown in FIG. 3, in the membrane electrode assembly 24, the hydrogen peroxide concentration sensors 60 and the electric potential sensors 68 are provided. Thus, while measuring the hydrogen peroxide concentration by the hydrogen peroxide concentration sensor 60 provided at the end adjacent to the anode 32, whether or not there is any increase in the electric potential is detected by the electric potential sensor 68 provided in combination with the hydrogen peroxide concentration sensor 60.

Figure 20:
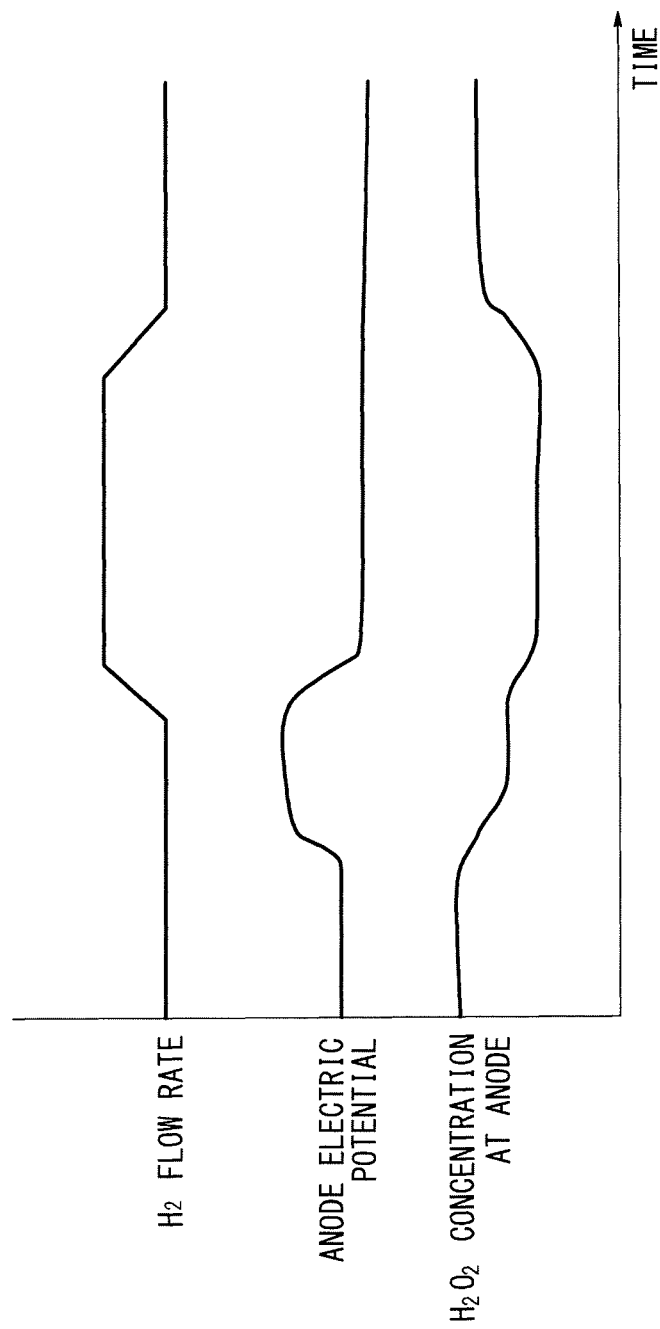
FIG. 20 is a timing chart of still another operating method.

Further, as shown in FIG. 20, when increase in the electric potential is detected by the electric potential sensor 68 and decrease in the hydrogen peroxide concentration is detected, as the decrease in the hydrogen peroxide concentration, active substances such as radical tend to be generated easily. In this regard, for example, by increasing the flow rate of the fuel gas, it becomes possible to restore the anode electric potential, and decrease the concentration of active substances. Further, instead of increasing the flow rate of the fuel gas, by increasing the humidity at the anode, it becomes possible to achieve reduction in the hydrogen peroxide concentration.

Figure 21:
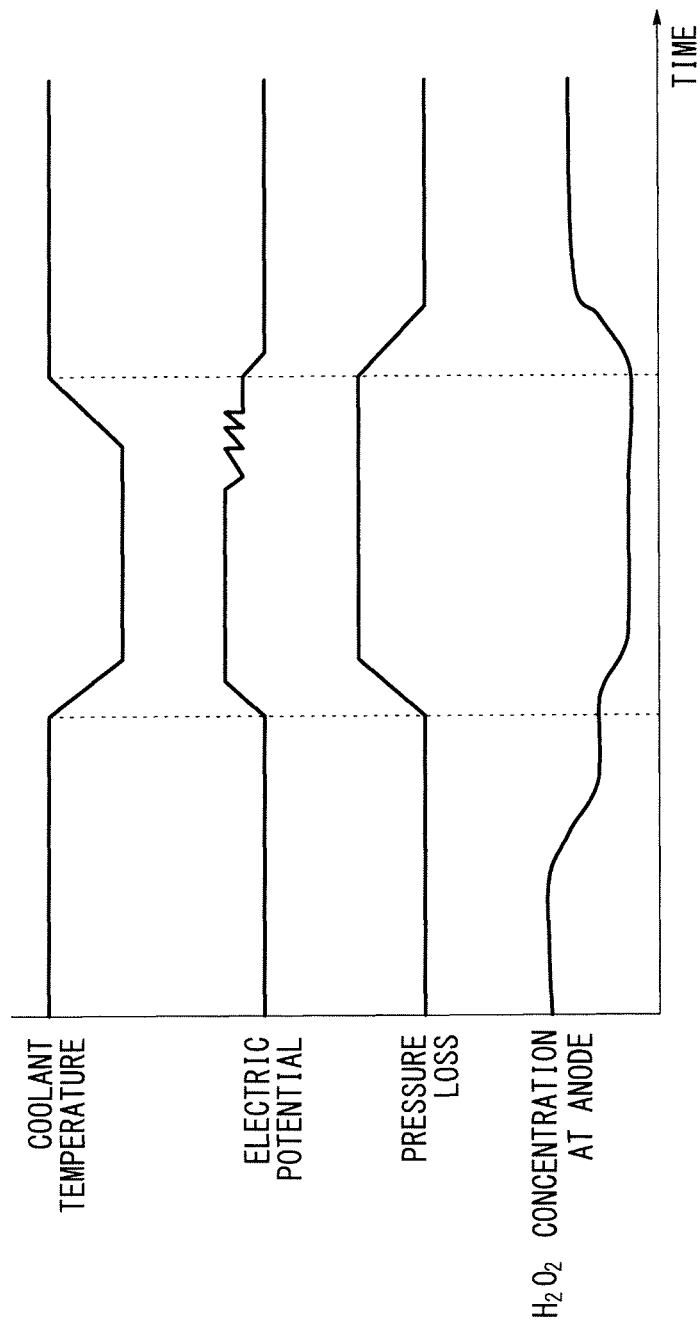
FIG. 21 is a timing chart of still another operating method.

Further, when decrease in the hydrogen peroxide concentration at the anode is confirmed, it becomes possible to decrease the temperature of the coolant. As shown in FIG. 21, by decreasing the temperature of the coolant, the oxygen-containing gas or the fuel gas is saturated with water vapor and condensation of the water vapor is induced to cause elution of hydrogen peroxide from the solid polymer electrolyte membrane 30. Further, the hydrogen peroxide concentration is checked by the hydrogen peroxide concentration sensor 60 provided adjacent to the solid polymer electrolyte membrane 30 to perform suitable operation immediately in accordance with the hydrogen peroxide concentration.

At this time, by additionally measuring the electric potential and the pressure loss or the like, it becomes possible to perform operation under the conditions where the control of the condensed water is implemented and the power generation stability is achieved. Further, if the above phenomenon occurs during the steady operation, the flow rate of the oxygen-containing gas may be increased to maintain the suitable operation.

Figure 22:
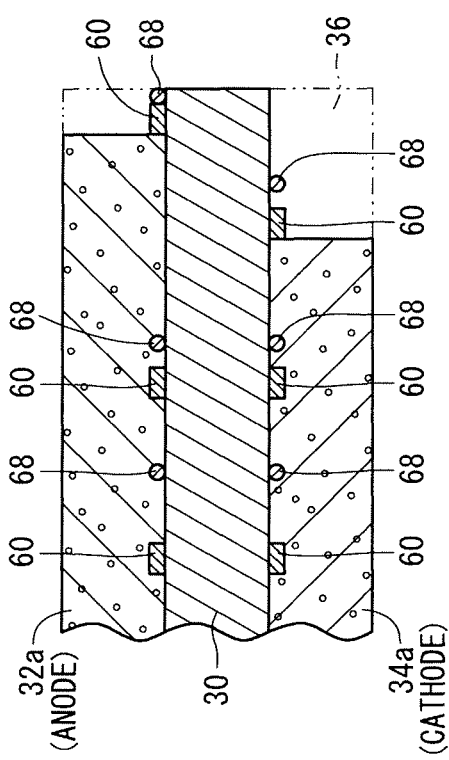
FIG. 22 is a cross sectional view showing main components of a membrane electrode assembly of a fuel cell where an operating method according to a third embodiment of the present invention is performed.

FIG. 22 is a cross sectional view showing main components of a membrane electrode assembly 122 of a fuel cell 120 according to a third embodiment of the present invention. The constituent elements that are identical to those of the fuel cell 10 according to the first embodiment are labeled with the same reference numerals, and description thereof will be omitted.

The membrane electrode assembly 122 includes an anode 32*a*, a cathode 34*a*, and a solid polymer electrolyte membrane 30 interposed between the anode 32*a* and the cathode 34*a*. The outer end of the anode 32*a* protrudes outward beyond the outer end of the cathode 34*a*. That is, the sizes of the anode 32a and the cathode 34a are opposite to the sizes of the anode 32 and the cathode 34 according to the first embodiment.

A predetermined number of the hydrogen peroxide concentration sensors 60 and a predetermined number of the electric potential sensors 68 are provided at predetermined positions on the solid polymer electrolyte membrane 30, on the surfaces facing the anode 32a and the cathode 34a, e.g., at ends of the anode 32a and the cathode 34a or in the anode 32a and the cathode 34a.

In the structure, in the third embodiment, it is possible to promptly and reliably detect the concentration of hydrogen peroxide generated in the membrane electrode assembly 122 by the hydrogen peroxide concentration sensors 60. Thus, the same advantages as in the case of the first embodiment are obtained.

Figure 23:
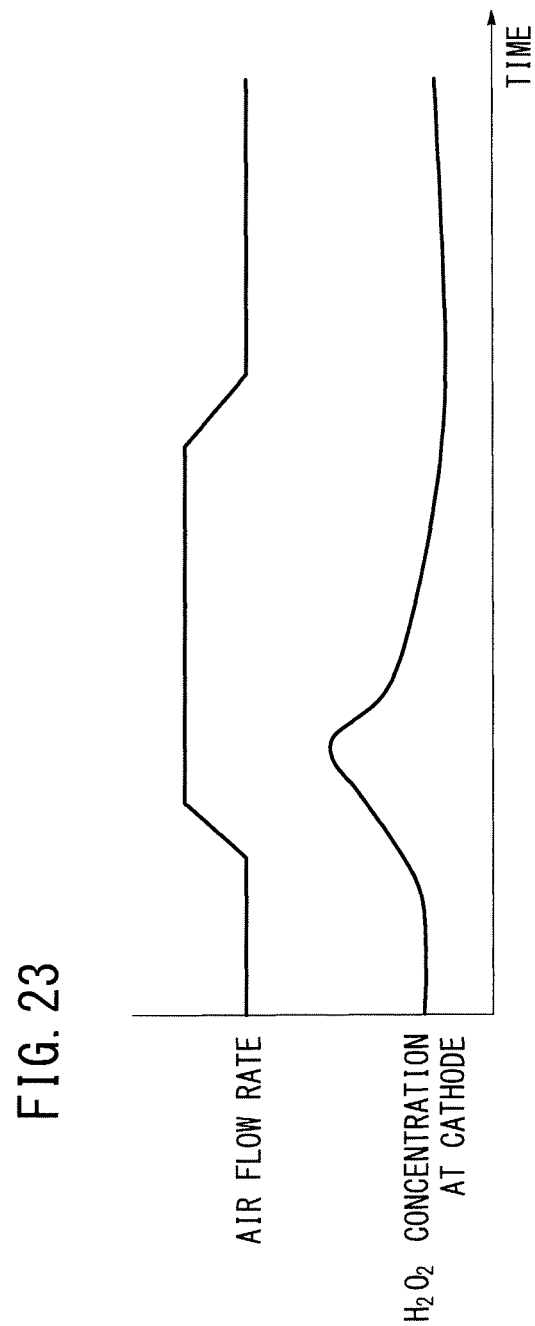
FIG. 23 is a timing chart of still another operating method.

For example, as shown in FIG. 23, if increase in the hydrogen peroxide concentration is confirmed by the hydrogen peroxide concentration sensor 60 provided adjacent to the cathode 34a, the flow rate of the oxygen-containing gas supplied to the cathode 34a is increased. Thus, it becomes possible to effectively reduce the hydrogen peroxide concentration.

Figure 24:
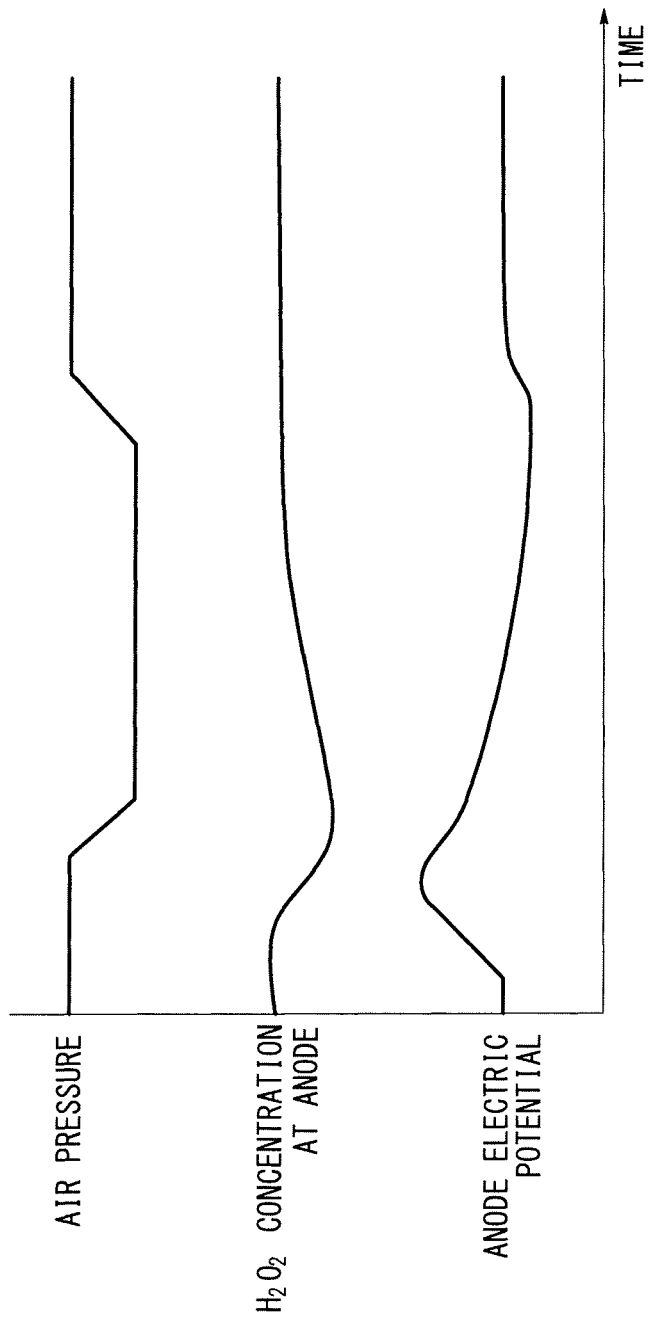
FIG. 24 is a timing chart of still another operating method.

In order to suppress the decrease in the hydrogen peroxide concentration, as shown in FIG. 24, the pressure of the oxygen-containing gas supplied to the cathode 34a should be decreased to maintain the suitable operation.

Further, if increase in the hydrogen peroxide concentration is confirmed, then by increasing the humidity of the oxygen-containing gas, it becomes possible to reduce the hydrogen peroxide concentration.

Further, as in the case of the control of FIG. 21, by decreasing the temperature of the coolant to cause elution of hydrogen peroxide from the solid polymer electrolyte membrane 30, it becomes possible to perform operation under conditions where the control of condensed water is implemented and power generation stability is achieved.

Further, FIG. 25 shows a cathode electric potential detected by the electric potential sensor 68 provided in combination with the hydrogen peroxide concentration sensor 60, which is disposed adjacent to the cathode 34a. If the decrease in the cathode electric potential and the increase in the hydrogen peroxide concentration are detected, the flow rate of the oxygen-containing gas supplied to the cathode 34a is increased. Thus, it becomes possible to effectively reduce the hydrogen peroxide concentration and reliably adjust the concentration to a desired value.

While the invention has been particularly shown and described with reference to preferred embodiments, it will be understood that variations and modifications can be effected thereto by those skilled in the art without departing from the scope of the invention as defined by the appended claims.

What is claimed is:

1. A method of operating a fuel cell formed by stacking a membrane electrode assembly and a separator, the membrane electrode assembly including an anode, a cathode, and an electrolyte membrane interposed between the anode and the cathode, the method comprising the steps of:
measuring hydrogen peroxide concentration of the membrane electrode assembly, in real time during power generation by a hydrogen peroxide concentration sensor including a Pt electrode having an insulating membrane disposed thereon, with a detection portion provided by cutting an area in one surface of the insulating membrane, wherein a surface of the detection portion protrudes outward beyond the insulating membrane in the thickness direction, and the detection portion contacts the electrolyte membrane and an electric potential sensor, where each is provided directly on the membrane electrode assembly and located at one of the following:
in an electrode surface of the anode;
between the anode and the electrolyte membrane;
at an end of the anode or cathode;
in an electrode surface of the cathode;
between the cathode and the electrolyte membrane;
in the electrolyte membrane,
determining an operating condition of the fuel cell based on the measured hydrogen peroxide concentration,
communicating the operating condition to a memory of a control unit, implementing control of the fuel cell based on the communicated operating condition;
controlling the concentration of hydrogen peroxide based on the operating condition communicated to the memory of the control unit.

2. The operating method according to claim 1, wherein a map is created based on a relationship between the measured hydrogen peroxide concentration and fuel cell voltage which has been obtained beforehand, and control of the fuel cell is implemented based on the fuel cell voltage obtained from the map.

3. The operating method according to claim 2, wherein the map obtained based on the relationship between the hydrogen peroxide concentration and the fuel cell voltage which has been obtained beforehand is corrected in correspondence with at least a shape of a gas flow field of the fuel cell or characteristic of the membrane electrode assembly.

4. A method of operating a fuel cell formed by stacking a membrane electrode assembly and a separator to form a fuel cell stack, the membrane electrode assembly including an anode, a cathode, and an electrolyte membrane interposed between the anode and the cathode; and a hydrogen peroxide concentration sensor including a Pt electrode having an insulating membrane disposed thereon, with a detection portion provided by cutting an area in one surface of the insulating membrane, wherein a surface of the detection portion protrudes outward beyond the insulating membrane in the thickness direction, and the detection portion contacts the electrolyte membrane and an electric potential sensor, where are each is located directly on the membrane electrode assembly at one of the following: in an electrode surface of the anode; between the anode and the electrolyte membrane; at an end of the anode or cathode; in an electrode surface of the cathode; between the cathode and the electrolyte membrane; in the electrolyte membrane;
the method comprising the steps of:
measuring hydrogen peroxide concentration during power generation; and determining at least one operating condition of the fuel cell based on the measured hydrogen peroxide concentration, and
communicating the operating condition to a memory of a control unit, wherein the operating condition includes at least one of: flow rate, dew point and the pressure of oxygen supplied to the fuel cell stack; flow rate, dew point, and pressure of oxygen containing gas discharged from the fuel cell stack;
flow rate, dew point and pressure of fuel gas supplied to the fuel cell stack; flow rate, dew point, and pressure of fuel gas discharged from a fuel cell stack;
temperature of coolant supplied to the fuel cell stack; and the temperature of the coolant discharged from the fuel cell stack, implementing control of the fuel cell based on the communicated operating condition; and controlling the concentration of hydrogen peroxide based on the operating condition communicated to the memory of the control unit.

5. The method of claim 4, wherein a map is created based on a relationship between the measured hydrogen peroxide concentration and fuel cell voltage which has been obtained beforehand, and control of the fuel cell is implemented based on the fuel cell voltage obtained from the map.

6. A method of operating a fuel cell according to claim 5, wherein control of the fuel cell is implemented by controlling the following conditions:

fuel gas flow rate; oxygen-containing gas flow rate; oxygen-containing gas pressure; humidity of reactant gasses; coolant temperature; and hydrogen flow rate.

7. A method of operating a fuel cell formed by stacking a membrane electrode assembly and a separator, the membrane electrode assembly including an anode, a cathode, and an electrolyte membrane interposed between the anode and the cathode, the method comprising the steps of:

measuring hydrogen peroxide concentration of the membrane electrode assembly, in real time during power generation by a hydrogen peroxide concentration sensor comprising a Pt electrode having an insulating membrane disposed thereon and with a detection portion provided by cutting an area in one surface of the insulating membrane, wherein a surface of the detection portion protrudes outward beyond the insulating membrane in the thickness direction, and the detection portion contacts the electrolyte membrane, provided at one end of the electrode, and an electrically conductive line is connected to the other end of the Pt electrode, and the hydrogen peroxide concentration sensor is provided on the membrane electrode assembly;

determining an operating condition of the fuel cell based on the measured hydrogen peroxide concentration, communicating the operating condition to a memory of a control unit, implementing control of the fuel cell based on the communicated operating condition; and controlling the concentration of hydrogen peroxide based on the operating condition communicated to the memory of the control unit.

8. The operating method according to claim 1, wherein the step of measuring hydrogen peroxide by the hydrogen peroxide concentration sensor includes a Pt electrode with a detection portion, includes a detection sensor having a cross sectional area of 2 mm$^2$ to 40 mm$^2$.

9. The operating method according to claim 1, wherein the step of measuring hydrogen peroxide by a hydrogen peroxide concentration sensor includes a Pt electrode with a detection portion, where the surface of said detection portion is covered by one of fluorine based electrolyte membrane and a hydrocarbon based electrolyte membrane.

* * * * *